United States Patent
Song

(10) Patent No.: US 9,136,512 B2
(45) Date of Patent: Sep. 15, 2015

(54) BATTERY PACK HAVING PARALLEL CONNECTOR

(75) Inventor: Youngbae Song, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 746 days.

(21) Appl. No.: 13/343,875

(22) Filed: Jan. 5, 2012

(65) Prior Publication Data

US 2012/0321936 A1 Dec. 20, 2012

(30) Foreign Application Priority Data

Jun. 14, 2011 (KR) .................. 10-2011-0057339

(51) Int. Cl.
*H01M 2/20* (2006.01)
*H01M 2/10* (2006.01)

(52) U.S. Cl.
CPC .............. *H01M 2/105* (2013.01); *H01M 2/204* (2013.01)

(58) Field of Classification Search
USPC ........................................................ 429/159
See application file for complete search history.

(56) References Cited

U.S. PATENT DOCUMENTS

| 7,811,701 | B2 | 10/2010 | Yao | |
|---|---|---|---|---|
| 2006/0105624 | A1* | 5/2006 | Yoshikane et al. | 439/500 |
| 2006/0177734 | A1* | 8/2006 | Yao | 429/160 |
| 2008/0124617 | A1 | 5/2008 | Bjork | |
| 2010/0081048 | A1* | 4/2010 | Nansaka et al. | 429/158 |

FOREIGN PATENT DOCUMENTS

| JP | 2004-031122 | | 1/2004 |
|---|---|---|---|
| JP | 2006120489 A | * | 5/2006 |
| JP | 2008-034318 A | | 2/2008 |
| JP | 2010-267405 A | | 11/2010 |
| WO | WO 2009/154855 A2 | | 12/2009 |

OTHER PUBLICATIONS

English machine translation of JP2006-120489A.*

* cited by examiner

*Primary Examiner* — Patrick Ryan
*Assistant Examiner* — Lucas J O Donnell
(74) *Attorney, Agent, or Firm* — Lee & Morse, P.C.

(57) ABSTRACT

Provided is a battery pack including a plurality of battery cells including at least one row of battery cells, an electrode tab connecting the plurality of battery cells to each other in parallel, and a bus bar coupled to the electrode tab, wherein the electrode tab includes a main plate extending parallel to the at least one row of battery cells, welding parts protruding from the main plate towards the battery cells, the welding parts being connected to electrode terminals of the battery cells, and connecting parts protruding opposite the welding parts, the connecting parts being connected to the bus bar.

20 Claims, 10 Drawing Sheets

BATTERY PACK HAVING PARALLEL CONNECTOR

BACKGROUND

1. Field

Embodiments relate to a battery pack.

2. Description of the Related Art

Generally, in order to provide a desired voltage and capacity, a power supply device used in a notebook personal computer, or a portable terminal, is configured by a plurality of battery cells connected in series and/or in parallel. In such a manner, the plurality of battery cells are connected in series and/or in parallel, forming a battery pack.

In order to electrically connect the plurality of battery cells, electrode tabs are generally used. The electrode tabs are commonly welded to a positive electrode or a negative electrode of each of the battery cells, thereby connecting the plurality of battery cells to each other in parallel. In addition, an output portion for extracting power is formed at an end of the electrode tab. As described above, the battery cells are connected to each other in parallel, thereby increasing the current in proportion to the number of battery cells connected in parallel. However, the current is not uniformly distributed to the battery cells, and heat is generated from the electrode tab, deteriorating the safety of the battery pack.

SUMMARY

One or more embodiments may provide a battery pack including a plurality of battery cells having at least one row of battery cells, an electrode tab connecting the plurality of battery cells to each other in parallel, and a bus bar coupled to the electrode tab, wherein the electrode tab includes a main plate extending parallel to the at least one row of battery cells, welding parts protruding from the main plate towards the battery cells, the welding parts being connected to electrode terminals of the battery cells, and connecting parts protruding in a direction opposite to the welding parts and connected to the bus bar.

The battery pack may further include a screw coupled to the electrode tab and the bus bar.

The welding part may be bent toward one side of the main plate and the connecting part may be bent toward an opposing side of the main plate.

The main plate may be substantially upright and the welding part and the connecting part may extend horizontally from the main plate.

The electrode tab may include a first electrode tab electrically connected to first electrode terminals of the battery cells, and a second electrode tab electrically connected to second electrode terminals of the battery cells.

The bus bar may include a first bus bar and a second bus bar, the first bus bar being coupled to the first electrode tab with a first screw, the second bus bar being coupled to the second electrode tab with a second screw.

A first output portion may be at a first end of the first bus bar, a second output portion may be at a first end of the second bus bar, and the first output portion and the second output portion may be aligned along the same side of the at least one row of battery cells.

The first output portion may be at one side of the at least one row of battery cells and the second output portion may be at an opposing side of the at least one row of battery cells.

The number of the welding parts and the number of the connecting parts may be equal to the number of the battery cells.

The welding parts may cover the electrode terminal of at least one of the battery cells.

The electrode tab and the bus bar may be made of different materials.

The electrode tab may be made of nickel and the bus bar may be made of copper.

The welding parts may be welded to the electrode terminals of the battery cells.

One or more embodiments may provide a battery pack including a plurality of battery cells including at least two rows of battery cells, an electrode tab connecting the plurality of battery cells to each other in parallel, and a bus bar coupled to the electrode tab, wherein the electrode tab may include a main plate extending parallel to the at least two rows of battery cells, and welding parts extending from opposite sides of the main plate and connected to the battery cells.

The battery pack may further include a screw coupled to the electrode tab and the bus bar. The welding parts may be welded to the battery cells.

The at least two rows of battery cells may be arranged at opposite sides of the main plate.

The welding parts may cover the electrode terminals of one or more of the battery cells.

The electrode tab and the bus bar may be made of different materials.

The electrode tab may include nickel and the bus bar may include copper.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
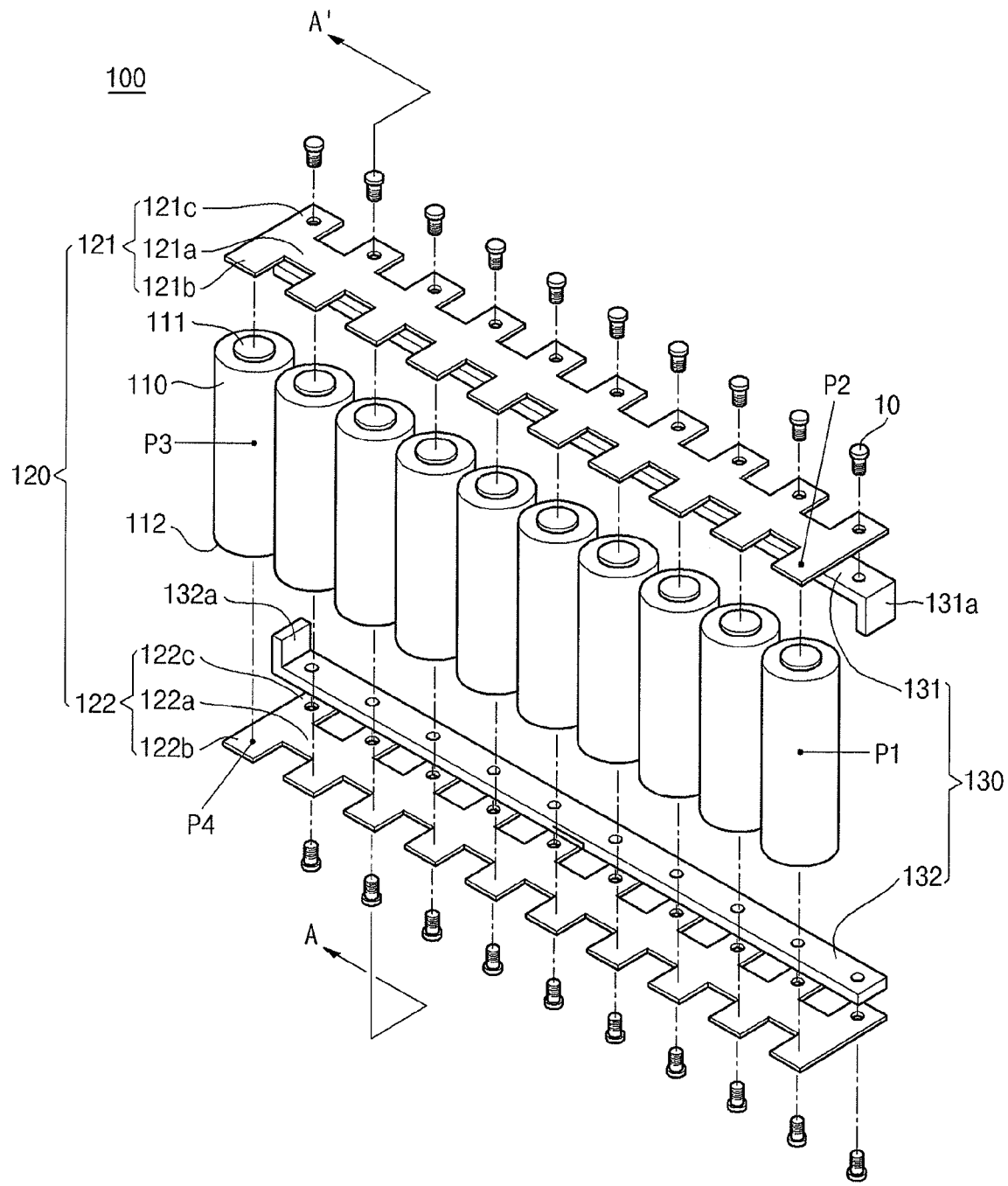
FIGS. 1A and 1B illustrate exploded perspective views of a battery pack according to an embodiment.

Korean Patent Application No. 10-2011-0057339, filed on Jun. 14, 2011, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1B:
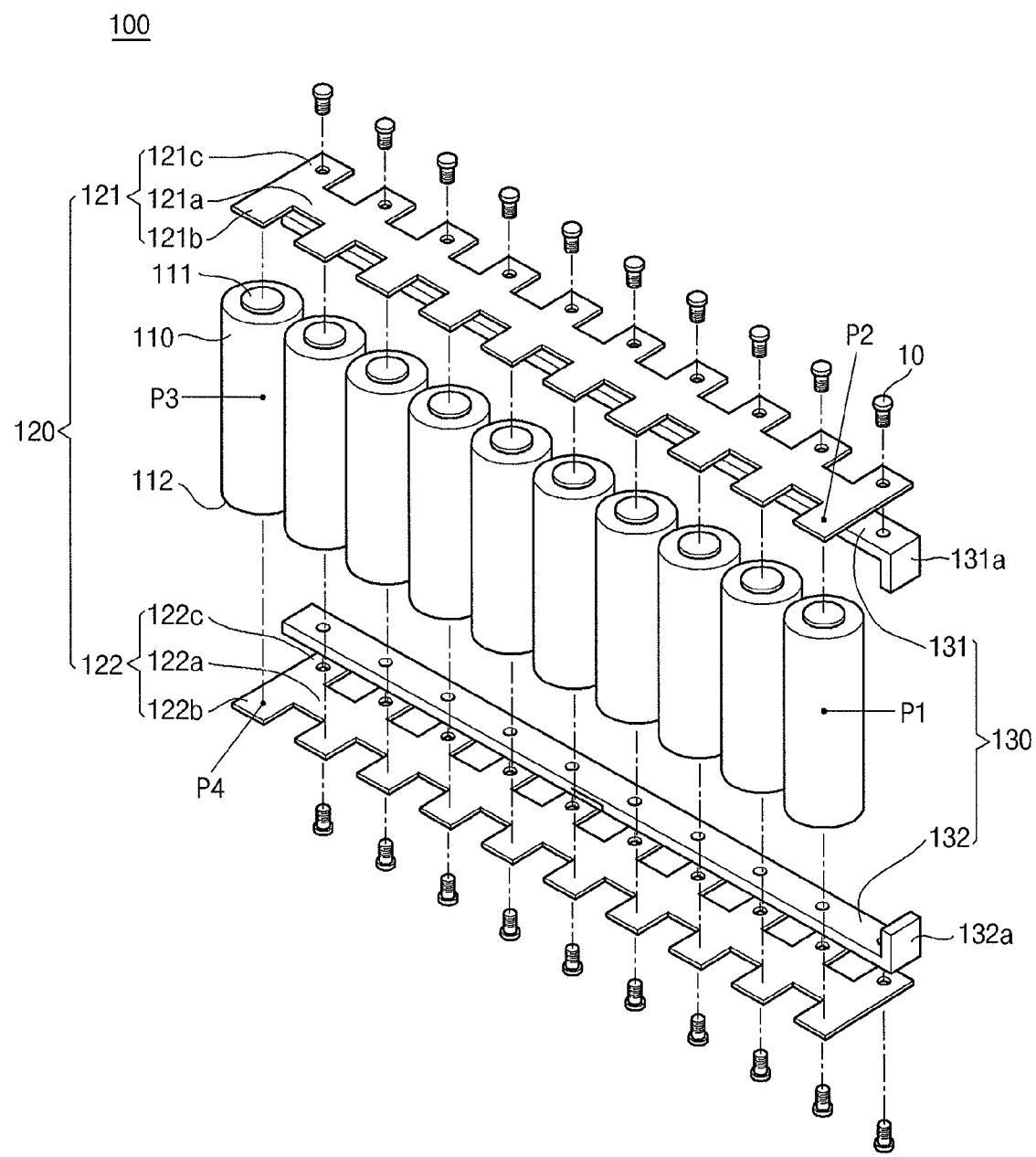
Figure 2:
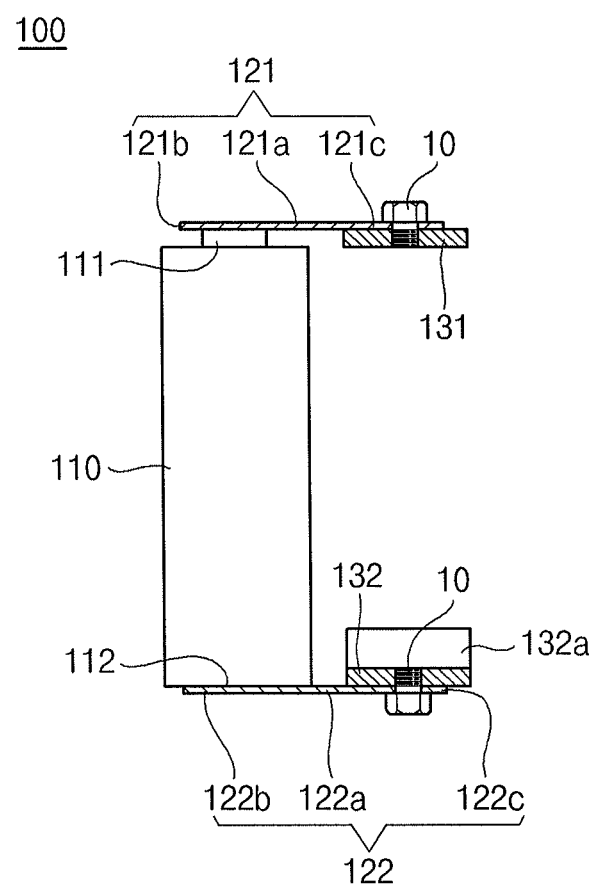
FIG. 2 illustrates a cross-sectional view taken along the line A-A' of FIG. 1A.

FIGS. 1A and 1B illustrate exploded perspective views of a battery pack according to an embodiment. FIG. 2 illustrates a cross-sectional view taken along the line A-A' of FIG. 1A.

Referring to FIGS. 1A to 2, the battery pack 100 according to an embodiment, may include a plurality of battery cells 110, an electrode tab 120, and a bus bar 130. The electrode tab 120 and the bus bar 130 may be coupled to each other using screws 10. While the screw 10 is described herein, it should be understood that any suitable fasteners may be used to couple the electrode tab 120 and the bus bar 130 to each other.

The battery cells 110 may generally be rechargeable batteries. For example, the battery cells 110 may be at least one of nickel-hydrogen batteries, lead batteries, lithium secondary batteries, and equivalents thereof. Further, the battery cells 110 may be at least one of cylindrical batteries, prismatic batteries, pouch-type batteries, and equivalents thereof. Each of the battery cells 110 may include a first electrode terminal 111 and a second electrode terminal 112. For example, the first electrode terminal 111 may be a positive electrode and the second electrode terminal 112 may be a negative electrode. Conversely, the first electrode terminal 111 may be a negative electrode and the second electrode terminal 112 may be a positive electrode.

According to one or more embodiments, as described below, the first electrode terminal 111 may be a positive electrode and the second electrode terminal 112 may be a negative electrode. The battery cells 110 may be arranged to be parallel with each other in a row. A plurality of battery cells 110 may form one battery pack 100. The electrode tab 120 may connect each of the battery cells 110 and may electrically connect the plurality of battery cells 110 to each other in parallel. The electrode tab 120 may include a first electrode tab 121 connected to the first electrode terminal 111 of the battery cells 110 and a second electrode tab 122 connected to the second electrode terminal 112.

The first electrode tab 121 may be electrically connected to the first electrode terminal 111 of each of the battery cells 110. The first electrode tab 121 may be welded to the first electrode terminal 111 of each of the battery cells 110. The first electrode tab 121 may have a plate shape. For example, the first electrode tab 121 may be generally flat. The first electrode tab 121 may be formed from nickel that has excellent electric conductivity and is capable of being easily soldered. The first electrode tab 121 may include a main plate 121a, a welding part 121b and a connecting part 121c.

The main plate 121a may extend in a direction in which the battery cells 110 are arranged. In an implementation, the plurality of battery cells 110 may include at least one row of battery cells. The main plate 121a may extend parallel to the at least one row of battery cells 110. The main plate 121a may have the same length as a length of in which the battery cells 110 are arranged. For example, the main plate 121a may have the same length as the at least one row of the battery cells 110. For example, the main plate 121a may extend from the first electrode terminal 111 of a first one or an outer one of the battery cells 110 in the battery pack to the first electrode terminal 111 of a last one or another outer one of the battery cells 110.

The welding part 121b may protrude from one side of the main plate 121a and may be electrically connected to the first electrode terminal 111 of each of the battery cells 110. For example, the welding part 121b may protrude from the main plate 121a toward the battery cells 110 and may be welded and, thereby, electrically connected to the first electrode terminal 111 of each of the battery cells 110. The number of welding parts 121b may be equal to the number of the battery cells 110. For example, ten (10) welding parts 121b may be formed to corresponding to ten (10) battery cells 110, as shown in FIG. 1A. Alternatively, the number of the welding parts 121b may be less than the number of the battery cells 110. For example, the welding parts 121b may be wide enough to cover first electrode terminals 111 of neighboring ones of the battery cells 110, i.e., adjacent battery cells. As such, one of the welding parts 121b may be connected to two or three battery cells 110. However, the number of the battery cells 110 connected to the welding parts 121b may be more than two or three. The welding parts 121b may be connected to the first electrode terminals 111 of the battery cells 110 by, without limitation, ultrasonic welding, resistance welding, or the like.

The connecting part 121c may protrude from another side of the main plate 121a. For example, the welding parts 121b and the connecting part 121c may protrude from opposing sides of the main plate 121a. The connecting part 121c may be coupled to the bus bar 130 using the screw 10. In an implementation, the connecting part 121c may extend from the main plate 121a in a direction opposite to the welding parts 121b and may be coupled to the first bus bar 131 using the screw 10. The number of connecting parts 121c formed may be equal to the number of the welding parts 121b. For example, ten of the welding parts 121b and ten of the connecting parts 121c may extend from opposite sides of the main plate 121a, respectively, as shown in FIG. 1A. Each of the connecting parts 121c has a hole coupled to the screw 10 to connect the first bus bar 131 to the first electrode tab 121. That is to say, the connecting part 121c and the first bus bar 131 are electrically connected to each other through the screw 10.

The second electrode tab 122 is electrically connected to the second electrode terminal 112 of each of the battery cells 110. The second electrode tab 122 may be formed from nickel having excellent electric conductivity and capable of being easily soldered. The second electrode tab 122 is welded to the second electrode terminal 112 of each of the battery cells 110. The second electrode tab 122 includes a main plate 122a, a welding part 122b and a connecting part 122c. The second electrode tab 122 may have the same configuration as the first electrode tab 121. As such, a detailed description of the second electrode tab 122 will not be given.

The bus bar 130 may be electrically connected to the electrode tab 120 and may electrically connect the battery pack 100 including the plurality of battery cells 110 to an external device (not shown). The bus bar 130 may be formed from copper having electric conductivity. The bus bar 130 may include a first bus bar 131 connected to the first electrode tab 121 and a second bus bar 132 connected to the second electrode tab 122.

The first bus bar 131 may extend in a direction in which the battery cells 110 are arranged. For example, the first bus bar 131 may extend parallel to the at least one row of battery cells 110. The first bus bar 131 may be coupled to the connecting part 121c of the first electrode tab 121. The first bus bar 131 may have a hole corresponding in position to the hole of the connecting part 121c. Therefore, the screw 10, may be engaged with the hole of the first bus bar 131 and the hole of the connecting part 121c, to electrically connect the first bus bar 131 and the first electrode tab 121 to each other. In an implementation, the first bus bar 131 may be fixed to the connecting part 121c with the screw 10. The first bus bar 131 and the electrode tab 121 may include any suitable metal material. The first bus bar 131 and the electrode tab 121 may be formed from different metal materials. For example, the first bus bar 131 may be formed from copper and the first electrode tab 121 be formed from nickel. The first electrode tab 121 and the first bus bar 131, formed from different materials, may be easily coupled to each other using the screw 10. In addition, a first output portion 131a, to which an external device may be connected, may extend from one end of the first bus bar 131. The first output portion 131a may include a bent portion extending from one end of the first bus bar 131 toward the second bus bar 132. The first output portion 131a may extend from a first end or a second end of opposing first and second ends of the first bus bar 131.

The second bus bar 132 may extend in a direction in which the battery cells 110 are arranged. For example, the second bus bar 132 may extend parallel to the at least one row of battery cells 110. The second bus bar 132 may be coupled to the connecting parts 122c of the second electrode tab 122. The second bus bar 132 may have the same configuration as the first bus bar 131. As such, a detailed description of the second bus bar 132 will not be given.

Referring to FIG. 1A, a second output portion 132a, formed at one end of the second bus bar 132. The second output portion 132a may extend from a first end or a second end of opposing first and second ends of the second bus bar 132. The first end of the second bus bar 132 may be aligned with the first end of the first bus bar 131, and the second end of the second bus bar may be aligned with the second end of the first bus bar 131. The second output portion 132a may be positioned to be generally opposite the first output portion 131a of the first bus bar 131. According to embodiments, the second output portion 132a may extend from a second of the bus bar 132 and the first output portion 131a may extend from a first end of the bus bar 131. The first output portion 131a may be at or adjacent to one side of the battery pack 100, and the second output portion 132a may be at or adjacent to another or opposing side of the battery pack 100. For example, if the first output portion 131a is at or adjacent to a first battery cell in a row of the battery cells 110, the second output portion 132a may be at or adjacent to a last battery cell in the row of the battery cells 110.

Referring to FIG. 1B, the second output portion 132a may be generally aligned with the first output portion 131a. In other words, the first output portion 131a and the second output portion 132a may be at or adjacent to the same side of the battery pack 100. For example, the first output portion 131a may extend from the first end of the first bus bar 131 and the second output portion 132a may extend from the first end of the second bus bar 132.

As described above, in the battery pack 100 according to some embodiments, the electrode tab 120 and the bus bar 130 may be engaged or coupled together by way of a screw, thereby facilitating coupling of the electrode tab 120 and the bus bar 130, which may be formed from different materials.

Figure 3:
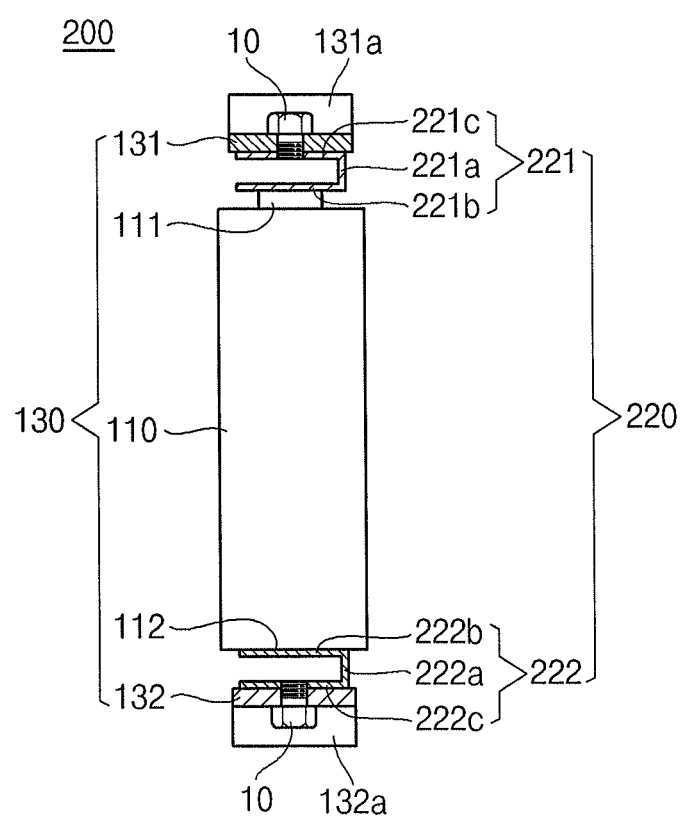
FIG. 3 illustrates a cross-sectional view of a battery pack according to another embodiment.

FIG. 3 illustrates a cross-sectional view of a battery pack according to another embodiment.

The battery pack 200 shown in FIG. 3 is substantially the same as the battery pack 100 shown in FIG. 2 except for certain features, which are described below.

Referring to FIG. 3, the battery pack 200, according to embodiments, may include a plurality of battery cells 110, including at least one row of battery cells 110, an electrode tab 220, and a bus bar 130.

The electrode tab 220 may include a first electrode tab 221 connected to a first electrode terminal 111 of each of the battery cells 110 and a second electrode tab 222 connected to a second electrode terminal 112 of each of the battery cells 110. The second electrode tab 222 may have the same configuration as the first electrode tab 221. As such, a detailed description of the second electrode tab 222 will not be given. Thus, only the first electrode tab 221 will be described below.

The first electrode tab 221 may be welded to the first electrode terminal 111 of each of the battery cells 110, and may be substantially 'U' shaped. The first electrode tab 221 may include a welding part 221b connected to the first electrode terminal 111, a main plate 221a extending substantially normal to the welding part 221b, and a connecting part 221c extending substantially normal to the main plate 221a. According to an embodiment, the welding part 221b and the connecting part 221c may be parallel to each other, and the main plate 221a may be perpendicular to the welding part 221b and the connecting part 221c. The main plate 221a may extend between and connect the welding part 221b and the connecting part 221c.

The main plate 221a may extend in a direction in which the battery cells 110 are arranged. For example, the main plate 221a may be generally upright and extend vertically over a top surface of the least one row of battery cells 110. The main plate 221a may have the same length as a length in which the battery cells 110 are arranged. For example, the main plate 221a may have the same length as the at least one row of battery cells 110. The main plate 221a may extend from the first electrode terminal 111 of a first one of the battery cells 110 in the at least one row of battery cells 110 to the first electrode terminal 111 of a last one of the battery cells 110 in the at least one row of battery cells 110.

The welding part 221b may be bent toward one side of the main plate 221a and may be electrically connected to the first electrode terminal 111. For example, the welding part 221b may be welded to the first electrode terminal 111 of each of the battery cells 110. The welding part 221b may be connected to the first electrode terminals 111 of the battery cells 110 by, without limitation, ultrasonic welding, resistance welding, or the like.

The connecting part 221c may be bent toward the other side of the main plate 221a and may be connected to the first bus bar 131. The connecting part 221c may be parallel to the welding part 221b. The connecting part 221c may have a hole to which the screw 10 may be coupled, to connect the first bus bar 131 to the first electrode tab 221. That is to say, the connecting parts 221c and the first bus bar 131 may be electrically connected to each other by the screw 10.

Next, evaluation results of the battery pack according to one embodiment will be described.

Figure 4A:
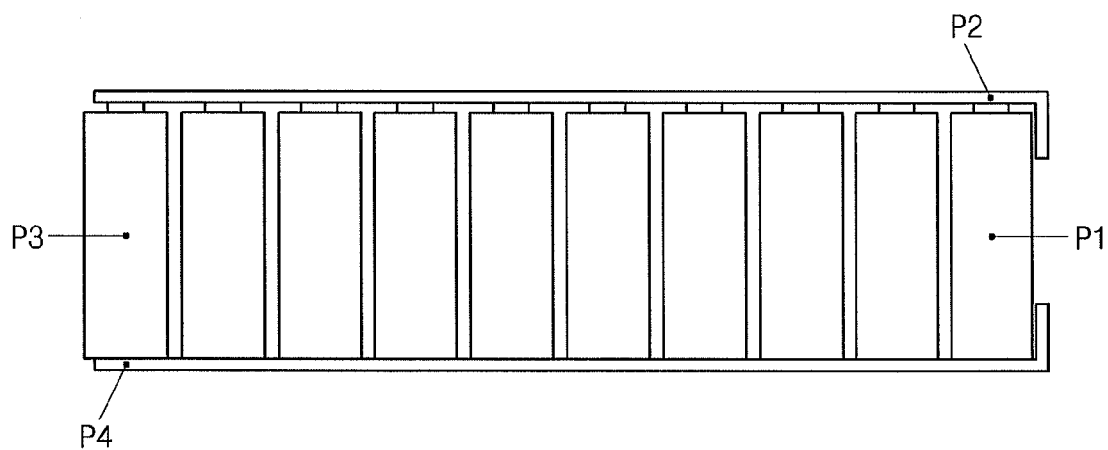
FIGS. 4A and 4B illustrate plan views of a battery pack according to comparative example to be compared with the battery pack according to an embodiment.
Figure 4B:
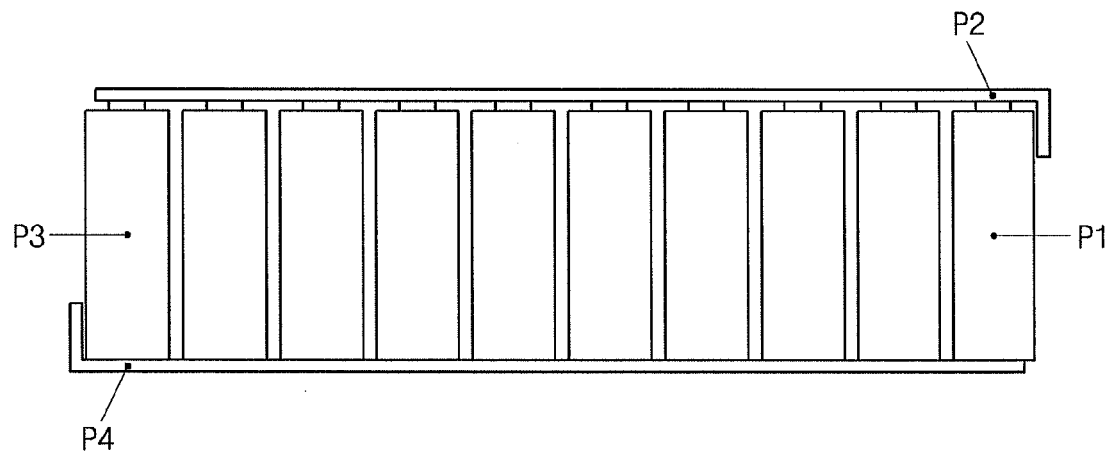
Figure 5A:
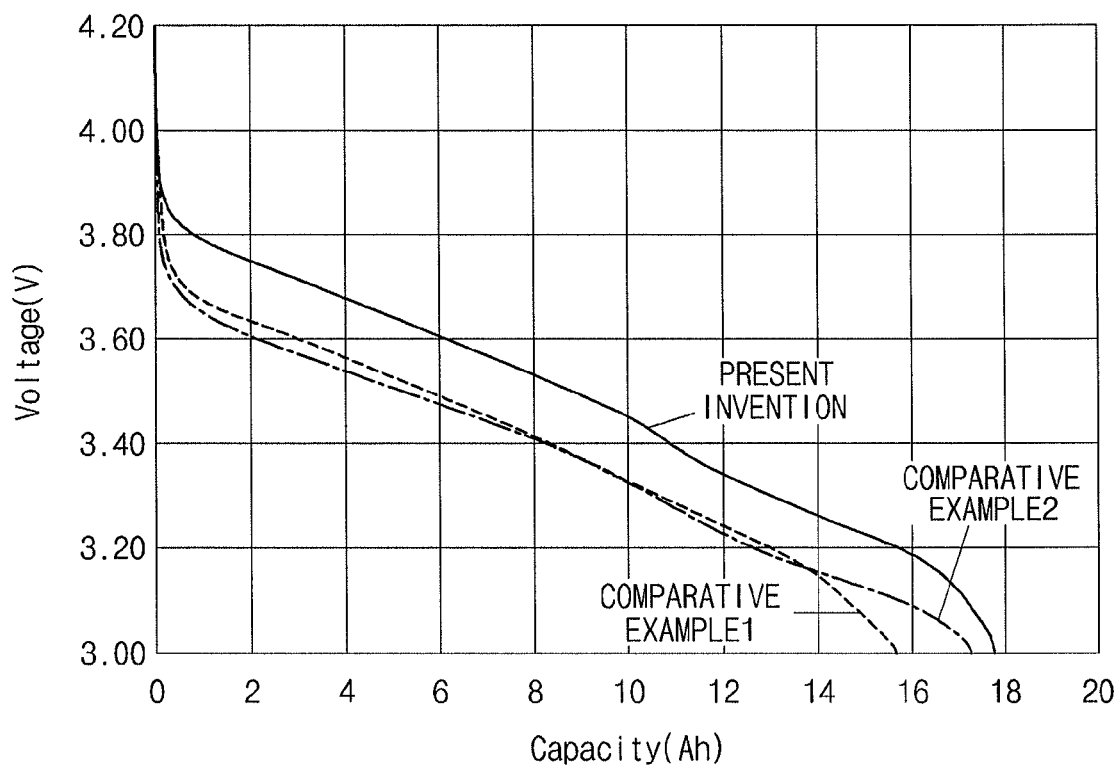
FIG. 5A illustrates a graph illustrating capacity levels of a battery pack according to an embodiment and a battery pack according to comparative example during discharging.
Figure 5B:
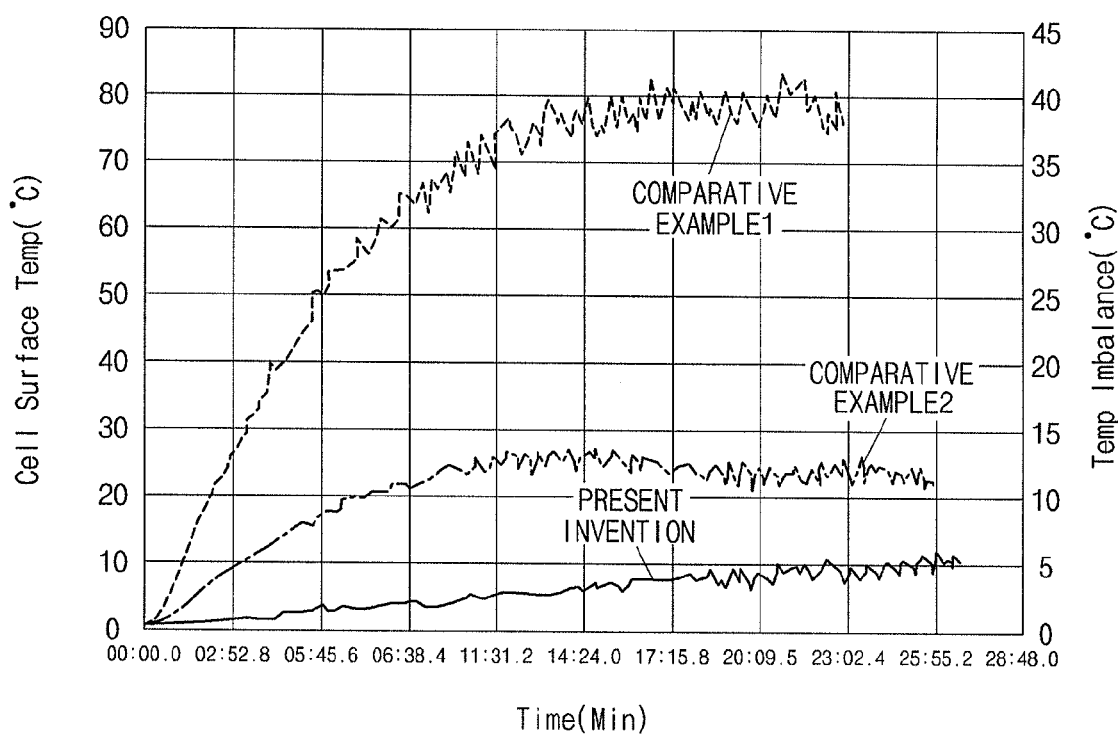
FIG. 5B illustrates a graph showing degradation distribution in the battery pack according to embodiments and battery packs according to comparative examples, during discharging.

FIGS. 4A and 4B illustrate plan views of a battery pack according to comparative examples, for comparison with the battery pack according to embodiments. FIG. 5A illustrates a graph showing capacity levels of a battery pack according to an embodiment and a battery pack according to comparative example, during discharging. FIG. 5B illustrates a graph showing degradation distribution in the battery pack according to an embodiment and battery packs according to comparative examples, during discharging.

Referring to FIG. 4A, the battery pack of Comparative Example 1 may include a plurality of battery cells (including one row of battery cells) connected to each other in parallel, and a positive electrode terminal and a negative electrode terminal welded thereto. An output portion of the positive electrode terminal and an output portion of the negative electrode terminal are formed in the same direction, e.g., aligned on the same side of the row of battery cells.

Referring to FIG. 4B, the battery pack of Comparative Example 2 may include a plurality of battery cells (including one row of battery cells) connected to each other in parallel, and a positive electrode terminal and a negative electrode terminal welded thereto. An output portion of the positive electrode terminal and an output portion of the negative electrode terminal are formed in opposite directions, e.g., on opposite sides of the row of battery cells.

As shown in FIG. 5A, during discharging, the battery pack 100 according to embodiments, may have a larger remaining capacity than the battery packs according to Comparative Examples 1 and 2. The battery packs according to Comparative Examples 1 and 2 undergo severe heating, compared to the battery pack 100 according to embodiments, resulting in a loss due to heat. Thus, the battery packs according to Comparative Examples 1 and 2 have reduced remaining capacities and lowered outputs compared to the battery pack 100 according to embodiments.

In addition, as shown in FIG. 5B, as discharging proceeds, the battery pack 100 according to embodiments, may generate less heat than the battery packs according to Comparative Examples 1 and 2. In addition, the battery pack 100 according to embodiments may maintain temperature balancing among the battery cells 110, achieving a temperature imbalance of approximately 5° C. or less. However, the battery pack according to Comparative Example 1, in which the output portion of the positive electrode tab and the output portion of the negative electrode tab are formed in the same direction, e.g., aligned on the same side, generates a relatively large amount of heat, which may deteriorate the battery pack performance.

Figure 6A:
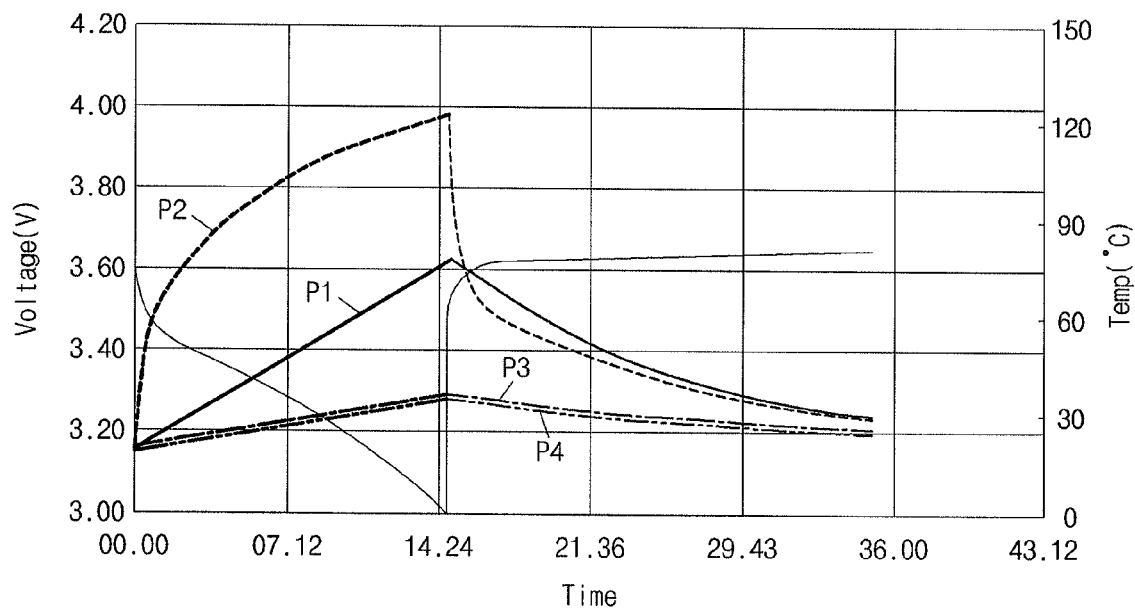
FIG. 6A illustrates a graph showing temperature change at various locations of a battery according to comparative example 1, during discharging.
Figure 6B:
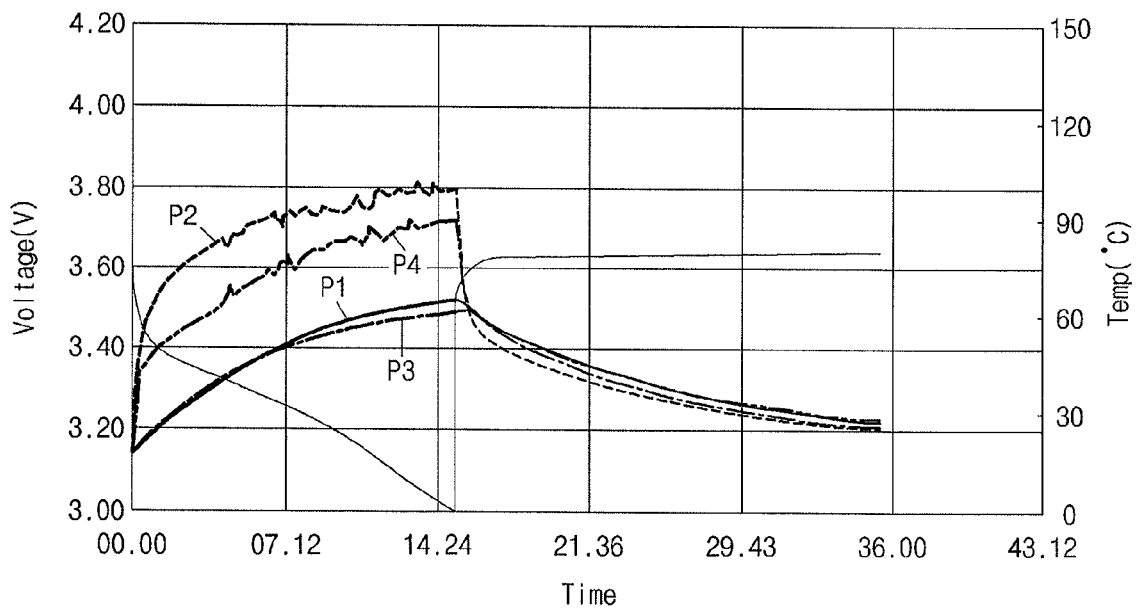
FIG. 6B illustrates a graph showing temperature change at various locations of a battery according to comparative example 2, during discharging.
Figure 6C:
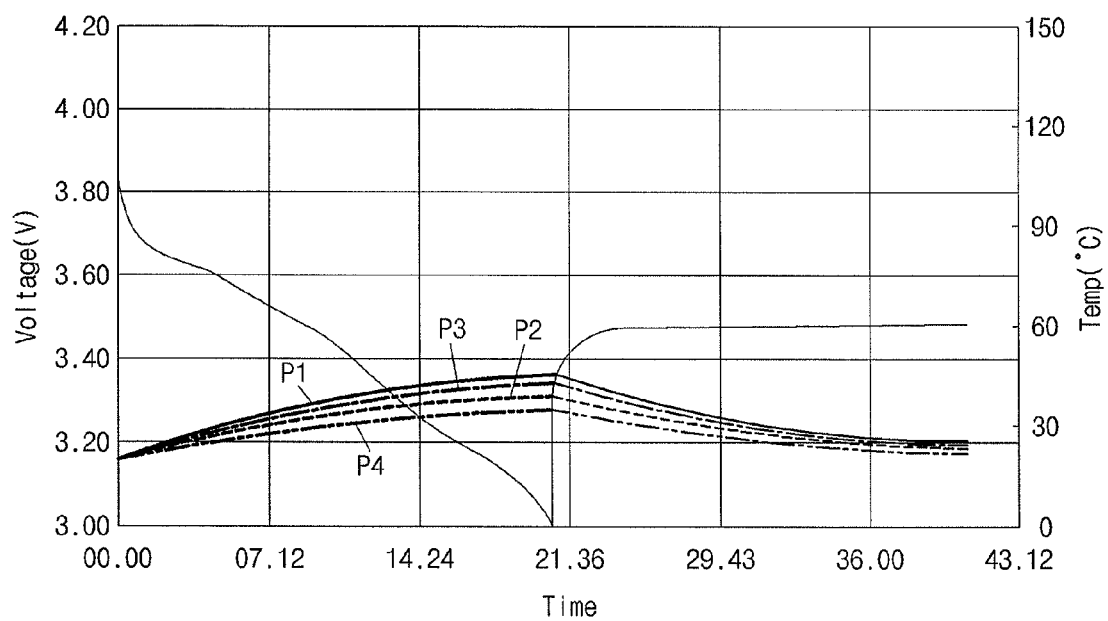
FIG. 6C illustrates a graph showing temperature change at various locations of the battery according to embodiments, during discharging.

FIG. 6A illustrates a graph showing a temperature change at various locations of the battery according to Comparative Example 1, during discharging. FIG. 6B illustrates a graph showing temperature change at various locations of the battery according to Comparative Example 2, during discharging. FIG. 6C illustrates a graph showing temperature change at various locations of the battery according to embodiments, during discharging. In FIGS. 6A to 6C, corresponding points of the respective battery packs are indicated as a first point P1, a second point P2, a third point P3 and a fourth point P4, respectively.

As shown in FIGS. 6A to 6C, during discharging, the battery pack 100 according to embodiments, may generate substantially the same amount of heat at the respective points while demonstrating the maximum temperature difference of 45° C. or less. In other words, the battery pack 100 according to embodiments may generate a small amount of heat, while generating a uniform amount of heat from the respective battery cells 110. In the battery pack according to Comparative Example 1, however, a relatively large amount of heat is generated at the first and second points P1 and P2, while a considerable temperature difference exists between each of the battery cells. In addition, the battery pack according to Comparative Example 2 shows a higher temperature than the battery pack according to embodiments.

As described above, in the battery pack 100 according to embodiments, the electrode tab 120 and the bus bar 130 may be engaged with screws. As such, the heat generated from the battery pack 100 may be reduced while temperature balancing is maintained between each of the battery cells 110. Accordingly, the battery pack 100 according to embodiment, may improve capacity and output while improving the reliability.

Figure 7:
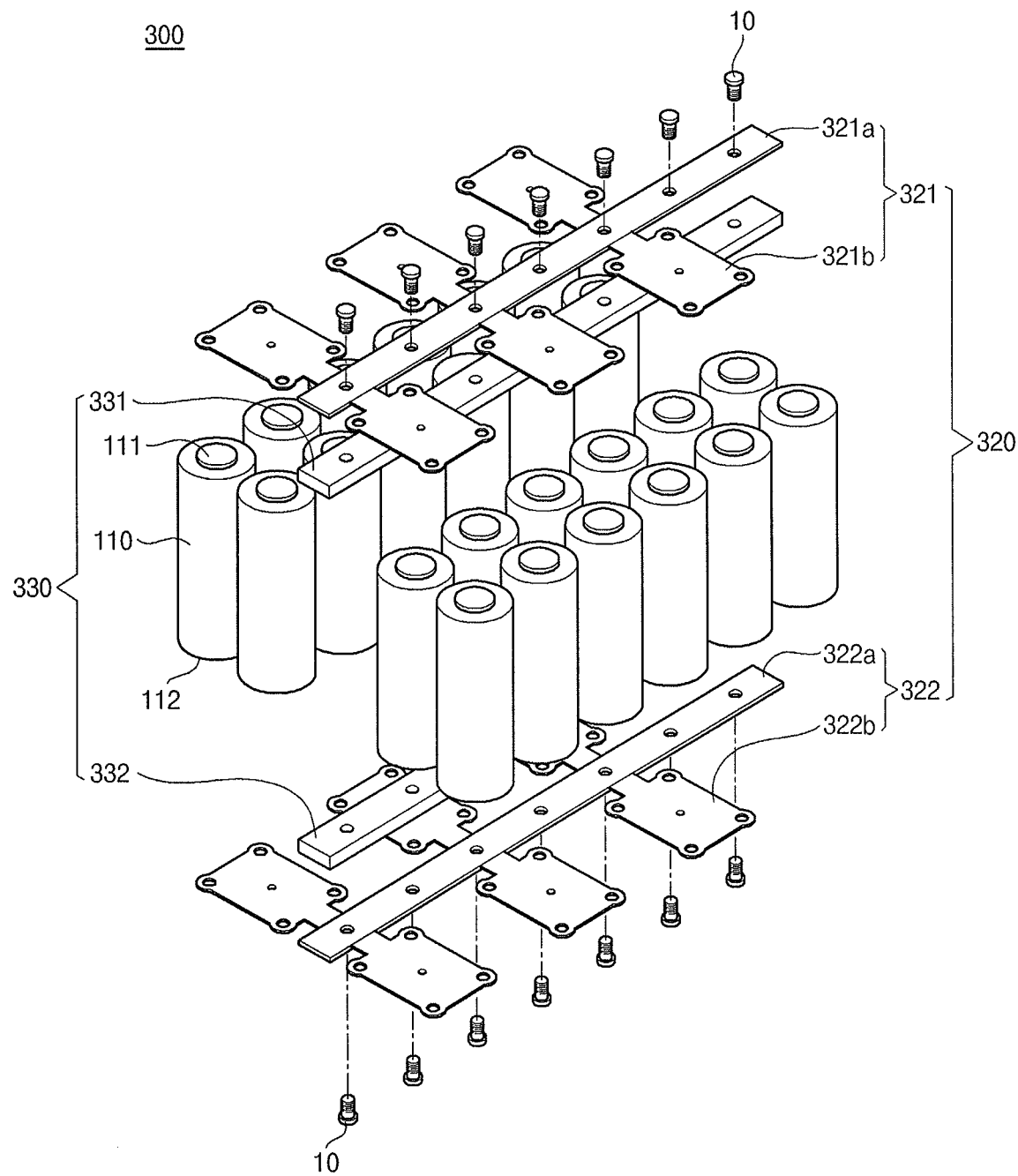
FIG. 7 illustrates an exploded perspective view of a battery pack according to embodiments.

FIG. 7 illustrates an exploded perspective view of a battery pack according to embodiments.

Referring to FIG. 7, the battery pack 300 according to embodiments may include a plurality of battery cells 110, an electrode tab 320, and a bus bar 330. The electrode tab 320 and the bus bar 330 may be engaged with screws 10.

A plurality of battery cells 110 may be arranged to be parallel with each other. The plurality of battery cells 110 may be aligned to form one or more rows of battery cells 110. For example, two, three, four, five, or six rows of battery cells 110 may be formed. As shown in FIG. 7, the rows of battery cells 110 may be arranged along opposite sides of main plates 321a and 322a of the electrode tab 320. Although FIG. 7 shows that the battery cells 110 are arranged at opposite sides of the main plates 321a and 322a in two rows, e.g., two rows of battery cells along each of opposing sides of the main plate 321a, embodiments are not limited to the arrangement of the battery cells 110 illustrated herein. The battery cells 110 may be the same as those described above. As such, a detailed description of the battery cells 110 will not be given.

The electrode tab 320 may be electrically connected to the battery cells 110 and may connect the plurality of battery cells 110 to each other in parallel. The electrode tab 320 may include a first electrode tab 321 connected to the first electrode terminal 111 of the battery cells 110 and a second electrode tab 322 connected to the second electrode terminal 112. The second electrode tab 322 may have the same configuration as the first electrode tab 321. As such, only the first electrode tab 321 will be below described.

The first electrode tab 321 may be electrically connected to the first electrode terminal 111 of each of the battery cells 110. The first electrode tab 321 may be formed from any suitable metal material having excellent electric conductivity and capable of being easily welded and soldered. For example, the first electrode tab 321 may include nickel. The first electrode tab 321 may be welded to the first electrode terminal 111 of each of the battery cells 110. The first electrode tab 321 may have a plate shape. The first electrode tab 321 may include a main plate 321a and welding parts 321b.

The main plate 321a may extend in a direction in which the battery cells 110 are arranged, e.g parallel to the battery cells 110. In addition, the main plate 321a may be centrally formed between opposite arrays of the battery cells 110 arranged at opposite sides of the main plate 321a. For example, the battery pack 300 may include an equal number of rows of battery cells 110 on either side of the main plate 321a. In an implementation, a plurality of battery cells 110 may be arranged in parallel with each other, along opposite sides of the main plate 321a. The main plate 321a may have holes coupled to fasteners, e.g., the screws 10, to connect the first bus bar 331 to the first electrode tab 321. In an implementation, the main plate 321a and the bus bar 331 may be electrically connected to each other with screws 10.

The welding parts 321b may protrude from opposite sides of the main plate 321a and may electrically connect to first electrode terminals 111 of the battery cells 110. In other words, the welding parts 321b may protrude from opposite sides of the main plate 321a, toward the battery cells 110 disposed at opposite sides of the main plate 321a, and may be electrically connected, e.g., welded, to the first electrode terminals 111 of the battery cells 110. In addition, the welding parts 321b may extend from opposite sides of the main plate 321a, and cover the first electrode terminals 111 of one or more of the battery cells 110. Each of the welding parts 321b may be configured to be attached to a plurality of battery cells 110.

While FIG. 7 illustrates each of the welding parts 321b covering the first electrode terminals 111 of groups of four neighboring or adjacent battery cells 110, embodiments are not limited to such a configuration. For example, the first electrode terminals of groups of two or more adjacent battery cells 110 may be covered by each of the welding parts 321b. The welding parts 321b may be connected to the first electrode terminals 111 of the battery cells 110 by, without limitation, ultrasonic welding, resistance welding, or the like.

The bus bar 330 may be electrically connected to the electrode tab 320 and may electrically connect the battery pack 300, including the plurality of battery cells 110, to an external device (not shown). The bus bar 330 may include a first bus bar 331, connected to the first electrode tab 321, and a second bus bar 332, connected to the second electrode tab 322. The second electrode tab 322 may have the same configuration as the first electrode tab 321. As such, a detailed description of the second electrode tab 322 will not be given. Thus, only the first electrode tab 321 will be described below.

The first bus bar 331 may extend in a direction in which the battery cells 110 are arranged, for example, parallel to the battery cells 110. The first bus bar 331 may be coupled to a main plate 321a of the first electrode tab 321. The first bus bar 331 may have a hole corresponding in position to a hole formed in the main plate 321a. Therefore, the screws 10 may engage the hole of the first bus bar 331 and the hole of the main plate 321a, thereby allowing the first bus bar 331 and the first electrode tab 321 to be electrically connected to each other. In other words, the first bus bar 331 may be fixed to the main plate 321a using the screws 10. The first bus bar 331 and the first electrode tab 321 may be formed from any suitable metal material. For example, the first bus bar 331 may include copper and the first electrode tab 321 may include nickel. Therefore, the first electrode tab 321 and the first bus bar 331, made of different materials, may be coupled to each other using the screws 10.

As described above, in the battery pack according to embodiments, the electrode tab and the bus bar may be engaged with a screw, thereby facilitating coupling the electrode tab and the bus bar, which are made of different materials. In addition, in the battery pack according to embodiments, the electrode tab and the bus bar may be engaged with a screw, thereby reducing the heat generated from the battery pack and maintaining temperature balancing between each of the battery cells. Accordingly, the battery pack according to embodiments may improve capacity and output and improve the reliability of the battery pack. Reliability may be improved by coupling an electrode tab and a bus bar, made of different materials, using a screw.

While embodiments have been described in connection with certain exemplary embodiments, it will be understood by those skilled in the art that the embodiments are not limited to the disclosed embodiments, but rather is intended to cover various modifications included within the spirit and scope of the appended claims and equivalents thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells including at least one row of battery cells;
an electrode tab connecting the plurality of battery cells to each other in parallel; and
a bus bar coupled to the electrode tab,
wherein the electrode tab includes
a main plate extending parallel to the at least one row of battery cells,
welding parts protruding from the main plate towards the battery cells, the welding parts being connected to electrode terminals of the battery cells; and
connecting parts protruding from the main plate opposite the welding parts, the connecting parts being connected to the bus bar.

2. The battery pack as claimed in claim 1, further comprising a screw coupled to the electrode tab and the bus bar.

3. The battery pack as claimed in claim 1, wherein the welding part is bent from one side of the main plate and the connecting part is bent from an opposing side of the main plate.

4. The battery pack as claimed in claim 3, wherein the main plate is substantially vertical and the welding part and the connecting part extend horizontally from the main plate.

5. The battery pack as claimed in claim 1, wherein the electrode tab includes a first electrode tab electrically connected to first electrode terminals of the battery cells, and a second electrode tab electrically connected to second electrode terminals of the battery cells.

6. The battery pack as claimed in claim 5, wherein the bus bar includes a first bus bar and a second bus bar, the first bus bar being coupled to the first electrode tab with a first screw, and the second bus bar being coupled to the second electrode tab with a second screw.

7. The battery pack as claimed in claim 5, wherein a first output portion is at a first end of the first bus bar, a second output portion is at a first end of the second bus bar, and the first output portion and the second output portion are aligned along the same side of the at least one row of battery cells.

8. The battery pack as claimed in claim 7, wherein the first output portion is at one side of the at least one row of battery cells and the second output portion is at an opposing side of the at least one row of battery cells.

9. The battery pack as claimed in claim 1, wherein the number of the welding parts and the number of the connecting parts are equal to the number of the battery cells.

10. The battery pack as claimed in claim 1, wherein each of the welding parts covers the electrode terminal of at least one of the battery cells.

11. The battery pack as claimed in claim 1, wherein the electrode tab and the bus bar are made of different materials.

12. The battery pack as claimed in claim 11, wherein the electrode tab is made of nickel and the bus bar is made of copper.

13. The battery pack as claimed in claim 1, wherein the welding parts are-welded to the electrode terminals of the battery cells.

14. A battery pack, comprising:
   a plurality of battery cells including at least two rows of battery cells;
   an electrode tab connecting the plurality of battery cells to each other in parallel; and
   a bus bar,
   wherein the electrode tab includes
      a main plate extending parallel to the at least two rows of battery cells, and
      welding parts extending from opposite sides of the main plate and connected to the battery cells, and
      the bus bar is coupled to the main plate of the electrode tab.

15. The battery pack as claimed in claim 14, further comprising a screw coupled to the electrode tab and the bus bar.

16. The battery pack as claimed in claim 14, wherein the welding parts are welded to the battery cells.

17. The battery pack as claimed in claim 14, wherein the at least two rows of battery cells are arranged at opposite sides of the main plate.

18. The battery pack as claimed in claim 14, wherein each of the welding parts cover the electrode terminals of one or more of the battery cells.

19. The battery pack as claimed in claim 14, wherein the electrode tab and the bus bar are made of different materials.

20. The battery pack as claimed in claim 19, wherein the electrode tab includes nickel and the bus bar includes copper.

* * * * *